Sept. 2, 1924.
O. F. SCHROEDER
TIRE ALARM
Filed Nov. 12, 1921
1,506,947
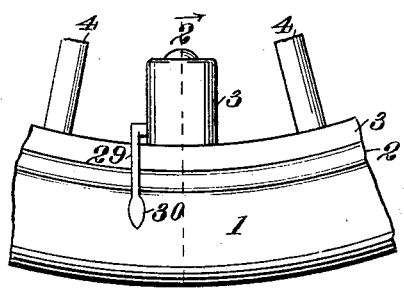
Fig.1.
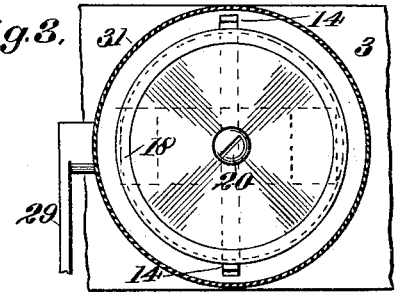
Fig.3.
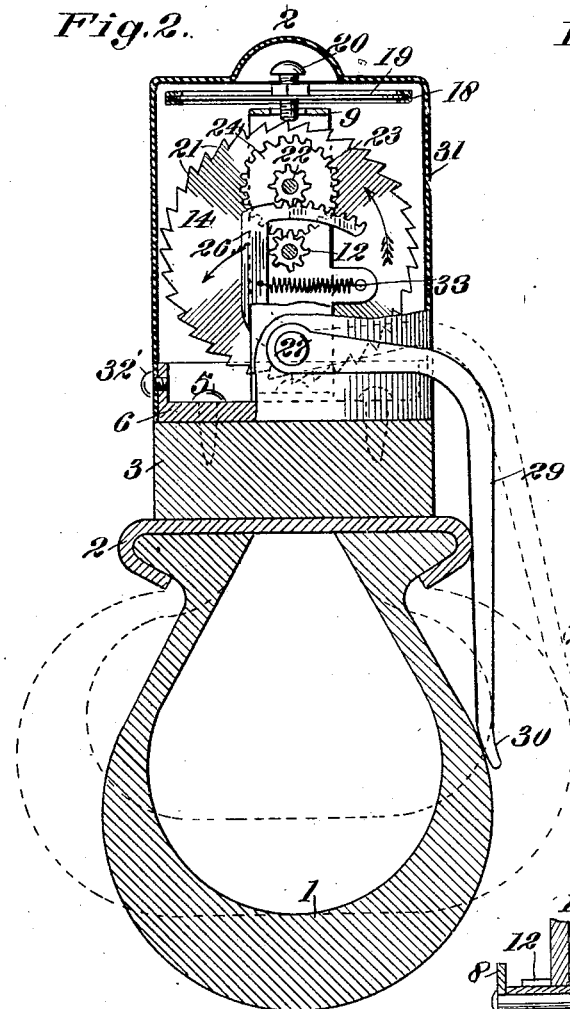
Fig.2.
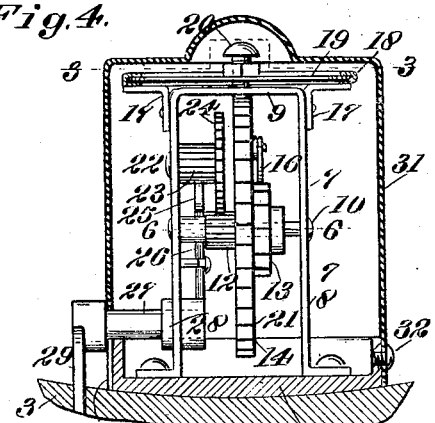
Fig.4.
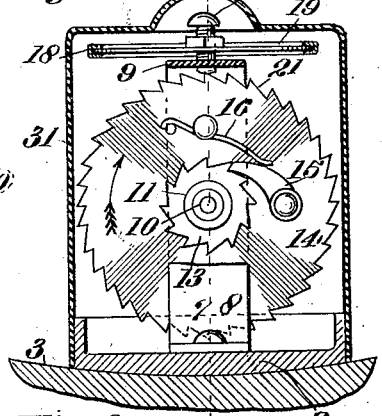
Fig.5.
Fig.6.
Inventor
O. F. Schroeder
By Cickeu & Potter
Attorneys Patented Sept. 2, 1924.

1,506,947

UNITED STATES PATENT OFFICE.

OTTO FRED SCHROEDER, OF SANTA ANA, CALIFORNIA.

TIRE ALARM.

Application filed November 12, 1921. Serial No. 514,626.

*To all whom it may concern:*

Be it known that I, OTTO FRED SCHROEDER, a citizen of the United States, residing at Santa Ana, in the county of Orange and State of California, have invented certain new and useful Improvements in Tire Alarms, of which the following is a specification.

The present invention relates to that class of devices designed to denote by an audible signal on each successive revolution of a pneumatic tire the degree of deflation of the tire.

This invention consists in an apparatus employing a vibratory member actuated by a toothed wheel which is in turn operated by the movement of a lever in one direction.

Among the objects of the present invention, are to provide a construction which is capable of manufacturing and assembling at an extremely low cost, due to the inexpensive stampings contained therein, and the use of a flat vibrating plate or member in place of a single member of the bell or ringing type; to provide a construction which is substantially dust proof and one which is adapted for use in connection with tires of any diameter without requiring intricate or complicated adjustments.

With the above mentioned and other objects in view, the invention consists in the novel construction and combination of parts hereinafter described, illustrated in the accompanying drawings and pointed out in the claim hereto appended; it being understood that various changes in the form, proportion, size and minor details of construction within the scope of the claim may be resorted to without departing from the spirit or sacrificing any of the advantages of the invention.

To more fully comprehend the invention, reference is directed to the accompanying drawings, wherein—

Fig. 1 is a view in broken side elevation of a portion of a wheel with my invention mounted thereon.

Fig. 2 is a sectional view taken on line 2—2 of Fig. 1, illustrating in dotted lines the tire position when the same is partially deflated.

Fig. 3 is a transverse sectional view taken on line 3—3 of Fig. 4.

Fig. 4 is a vertical sectional view taken on line 4—4 of Fig. 5.

Fig. 5 is a view taken on line 2—2 of Fig. 1, viewed in the direction reverse to that of the arrows—Fig. 1.

Fig. 6 is a view in detail on line 6—6 of Fig. 4.

In the drawings, 1 indicates a vertical tire mounted on a rim 2 carried by a felloe 3, which is in turn supported by spokes 4. Secured in any suitable manner by screws 5 to the inner periphery of the felloe 3 is a cupped base 6. The base 6 provides a support for an open elongated mechanism mounting frame 7, consisting of side members 8 and the top connecting member 9. The side members 8 are united by a shaft 10 on which is rotatably mounted a sleeve 11 carrying at one end a pinion gear 12 and spaced therefrom adjacent its opposite end is a ratchet 13.

Rotatably mounted on said sleeve 11 between the pinion 12 and ratchet 13 is a peripherally toothed operating wheel or disk 14 of a diameter to extend in close proximity to the member 9. One face of the member 14 carries a pivotally mounted pawl 15 yieldably forced inwardly into contact with the teeth of the ratchet 13 by an operating spring 16—Figs. 4 and 5 of the drawings.

Secured to the members 8 are the portions 17 of an auxiliary frame formed with an annular rim 18, within which is held a vibrating disk 19 centrally through which projects an adjustable contact screw 20 which is adapted to be engaged by the peripheral teeth 21 on disk 14 when said disk or wheel is rotated.

Extended inwardly from one of the members 8 at a point above the shaft 10 is a stub shaft 22 rotatably mounting a pinion 23 connected with a gear wheel 24 which is adapted to engage the pinion 12 on the sleeve 11. Coacting with the pinion 23 is an arcuate rack 25 carried by an arm 26 secured to and extending upwardly from one end of a rotary shaft 27 rotatable in a bearing 28 in the member 8 mounting the stub shaft 22. The shaft 27 extends upwardly over the periphery of the cupped base 6 and to the same is secured one end of a bent lever 29, the free end 30 of which is adapted to contact with the outer surface of the tire casing 1, as indicated in Fig. 2 of the drawings.

A dust proof housing or shell 31 provided with a slot 32 for receiving the shaft 27 is adapted for positioning over the mechanism above described and to be detachably secured to the cupped base 6 by screws 32'.

On each complete revolution of the vehicle wheel, the degree or distortion of the tire, due to lack of deflation will swing the lever 29 outwardly, causing the rack 25 to impart, through the gear train, a rotative movement to the wheel 14 in the direction of the arrows—Figs. 2 and 5. This operation causes the teeth 21 to contact with the member 20 and vibrate the member 19, warning the vehicle operator of the condition of inflation or deflation of the tire. The continued rotation of the vehicle wheel which removes that portion of the tire adjacent to the lever 1 from in contact with the road surface, permitting the tire to assume its normal shape, permits the spring 33 to operate or draw the lever 29 inwardly maintaining the end 30 thereof in contact with the tire surface, which movement rotates the sleeve 11 on the shaft 10 and within the wheel 14, permitting a partial rotative movement of the ratchet 13 in one direction relative to the wheel 14 without imparting an operative movement to the disk or diaphragm 19.

It will be observed that the length of the rack 25 permits of the mounting of this present invention on felloes mounting tires of different diameters or cross sectional areas without requiring any adjustment of the mechanism.

Having thus described my invention, what I claim as new and desire to secure by Letters Patent of the United States is:—

A tire alarm including a base, a substantially U-shaped frame secured at one end thereto and extending outwardly therefrom, said frame provided with an apertured stirrup, a secondary frame carried by the stirrup of the main frame and including a diaphragm mounting ring disposed parallel with the stirrup, a diaphragm peripherally held at substantially right angles to the main frame members, an adjustable contact pin centrally carried by the diaphragm with its end projecting through the aperture in the stirrup of the main frame, a shaft extended transversely between the main frame members, a pawl and ratchet operated toothed wheel carried by said shaft with its periphery in cooperative relation with the contact pin, a cap for fitting over said frames to enclose the same and said diaphragm and detachably secured to said base, and a lever secured at one end of the shaft.

In testimony whereof I have signed my name to this specification.

OTTO FRED SCHROEDER.